United States Patent Office 2,762,826
Patented Sept. 11, 1956

2,762,826

TRIORGANOSILYL METHYL ISOTHIOCYANATES

John E. Noll, Monroeville, Pa., assignor to Dow Corning Corporation, Midland, Mich., a corporation of Michigan No Drawing. Application September 7, 1954, Serial No. 454,605

3 Claims. (Cl. 260—448.2)

This invention relates to triorganosilylmethyl isothiocyanates.

It is the object of this invention to prepare novel compositions of matter which are useful for fungicides.

This invention relates to compositions of matter of the formula $R_3SiCH_2NCS$ in which R is selected from the group consisting of monovalent hydrocarbon radicals and hydrocarbonoxy radicals.

The compositions of this invention may be prepared by two methods both of which involve the use of triorganosilylmethylamines of the formula $R_3SiCH_2NH_2$ where R is as above defined. In both of the methods these amines are reacted with carbon disulfide. In the first method the reaction is carried out in the presence of an alkali metal hydroxide and an alcohol whereupon the product is an alkali metal salt of a dithiocarbamic acid of the formula

$$R_3SiCH_2NH\overset{S}{\underset{\|}{C}}SM$$

The alkali metal salt is then treated with lead nitrate whereupon the lead salt of a dithiocarbamic acid precipitates. These salts have the formula

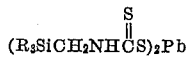
$$(R_3SiCH_2NH\overset{S}{\underset{\|}{C}}S)_2Pb$$

The lead salts are decomposed by heating to give the corresponding isothiocyanates of the formula

$$R_3SiCH_2NCS$$

and lead hydrosulfide.

The second method involves reacting the above triorganosilylmethylamines with carbon disulfide in the presence of trimethylamine in benzene solution. The resulting product is the salt of the formula

$$R_3SiCH_2NH\overset{S}{\underset{\|}{C}}SHNMe_3$$

This material is then reacted with ethylchlorocarbonate to give the desired isothiocyanates.

The triorganosilylmethylamines which are employed as starting materials in the process of this invention are described and claimed in the copending application of John L. Speier, Serial No. 171,551, filed June 30, 1950, now Patent No. 2,738,357.

For the purpose of this invention R can be any monovalent hydrocarbon radical such as for example alkyl radicals such as ethyl, methyl and octadecyl; alkenyl radicals such as vinyl, allyl and decenyl; cycloaliphatic radicals such as cyclohexyl and cyclohexenyl; aryl hydrocarbon radicals such as phenyl, tolyl and xenyl; and aralkyl radicals such as benzyl. Likewise R can be any hydrocarbonoxy radical of the formula RO— in which R is any monovalent hydrocarbon radical such as those above defined.

The following examples are illustrative only and should not be construed as limiting the invention which is properly defined in the appended claims.

Example 1

30 g. of trimethylsilylmethylamine was dissolved in 200 cc. of ethanol containing 10 g. of sodium hydroxide and 15 g. of carbon disulfide was added to the solution which is maintained at 0° C. On standing, sodium N-trimethylsilylmethyl dithiocarbamate precipitated in 90% yield.

A solution of lead nitrate was added to an aqueous solution of the sodium N-trimethylsilylmethyl dithiocarbamate. A yellow solid precipitated. This was the lead salt of the formula

$$(Me_3SiCH_2NH\overset{S}{\underset{\|}{C}}S)_2Pb$$

The lead salt was filtered and heated whereupon it decomposed to give the compound trimethylsilylmethyl isothiocyanate, B. P. 90° C. at 25 mm., $n_D^{25}$ 1.4984, $d_4^{25}$ 0.938, specific refraction 0.3128. This material reacted with aniline to give N-phenyl-N'-(trimethylsilylmethyl) thiourea, M. P. 122 to 123° C.

Example 2

The trimethylamine salt of triethoxysilylmethyl dithiocarbamate was prepared by dissolving 48.5 g. of triethoxysilylmethylamine, 18 g. of trimethylamine and 19 g. of carbon disulfide in benzene. 32.5 g. of ethyl chlorocarbonate was then added to the solution. A precipitate of trimethylamine hydrochloride was formed. This was filtered and the filtrate was distilled to give triethoxysilylmethyl isothiocyanate [(EtO)$_3$SiCH$_2$NCS] having the following properties: B. P. 120° C. at 3 mm., $n_D^{25}$ 1.4558, $d_4^{25}$ 1.034, specific refraction 0.2628.

Example 3

When octadecylvinylphenylsilylmethylamine is reacted with carbon disulfide in alcoholic sodium hydroxide in the manner of Example 1 and the resulting product is treated with lead nitrate and thereafter heated as shown in that example, the product octadecylvinylphenylsilylmethyl isothiocyanate [(C$_{18}$H$_{37}$)PhMeSiCH$_2$NCS] is obtained.

Example 4

When dimethylphenoxysilylmethylamine is reacted with carbon disulfide and trimethylamine in benzene solution and thereafter with ethyl chlorocarbonate in accordance with the method of Example 2 the compound dimethylphenoxysilylmethyl isothiocyanate

[Me$_2$(PhO)SiCH$_2$NCS]

is obtained.

That which is claimed is:

1. Compounds of the formula $R_3SiCH_2NCS$ in which R is selected from the group consisting of alkyl and alkoxy radicals.
2. Trimethylsilylmethyl isothiocyanate.
3. Triethoxysilylmethyl isothiocyanate.

References Cited in the file of this patent

Cooper: "Jour. Am. Chem. Soc.," vol. 76 (1954), pages 2499, 2500, effective date December 29, 1953.